Aug. 4, 1931.          D. T. EIGHMEY          1,817,134
                         FILM SPOOL
                     Filed May 25, 1929

Inventor
D. T. Eighmey.
By his Attorneys

Patented Aug. 4, 1931

1,817,134

UNITED STATES PATENT OFFICE

DAVID T. EIGHMEY, OF LONG ISLAND CITY, NEW YORK, ASSIGNOR TO FAIRCHILD AERIAL CAMERA CORPORATION, OF NEW YORK, N. Y., A CORPORATION OF NEW YORK

FILM SPOOL

Application filed May 25, 1929. Serial No. 365,807.

This invention relates in general to film spools and has for one of its objects the provision of a spool which by reason of its improved construction may be readily placed in its proper position in a camera.

In certain phases of photography, and especially in connection with the placing of a spool wound with unexposed film in an aerial camera, it is essential that this operation shall take place in darkness. Difficulty is often experienced in accomplishing this under these conditions, in centering both ends of the spool to their corresponding engaging suspending members located in the camera magazine.

It is therefore an object of this invention to provide a film spool which will be easily centered by means of improved engaging means of a guiding nature without the necessity of attending magazine elements to contact with the periphery of the film spool end plates.

With the foregoing and other objects in view the invention consists in the combination of parts and in the details of construction hereinafter set forth in the specification and appended claims, certain embodiments thereof being illustrated in the accompanying drawings, in which:

Figure 1:
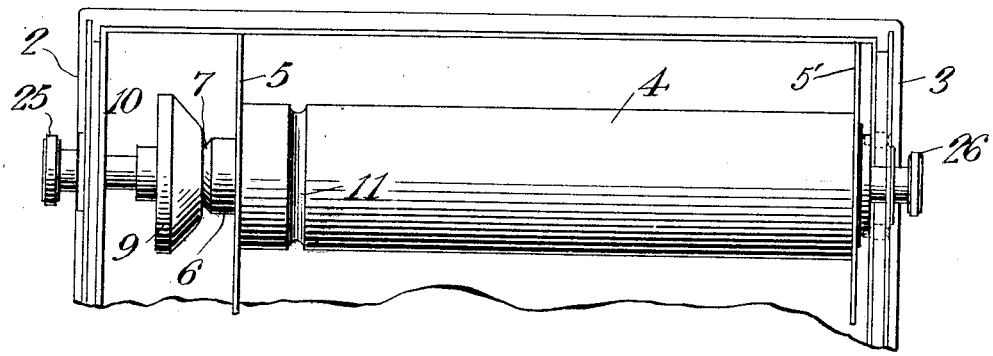
Fig. 1 is a view in section showing a portion of the camera magazine and showing the film spool and attaching means in elevation.
Figure 2:
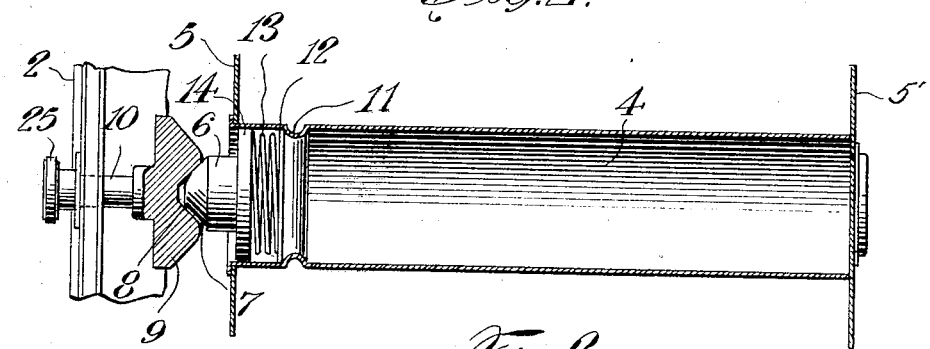
Fig. 2 is a view in section taken through the spool and a portion of the magazine.

Referring more particularly to the drawings, the form of spool, shown in Figs. 1 and 2, consists in a barrel 4 with enlarged end pieces 5 and 5', mounted within the magazine 1 between the end walls 2 and 3. The spool barrel is grooved at 11 to form an abutment for a plate 12. A plunger 6, attached to a plate 14 is normally spring pressed outwardly by a compression spring 13 bearing against the plate 12. The plunger 6 is bevelled at 7 to fit in a correspondingly bevelled groove 8 in the suspending member 9 carried by the shaft 10 which is mounted in the magazine and rotatable by the knob 25. This attaching means for the spool may be provided either for both ends or for one end. It is primarily essential to have at least one end so arranged and the attaching device at the end 3 which is rotatable by the knob 26 may be as shown of any suitable conventional type.

Figure 3:
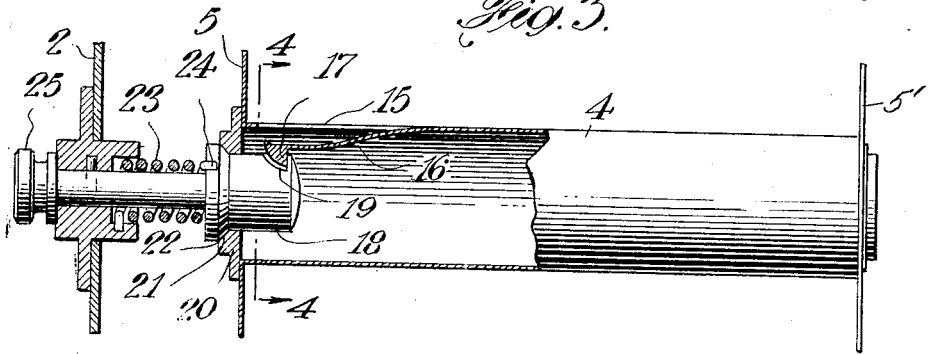
Fig. 3 is a similar view of a modified form of spool and attaching means.
Figure 4:
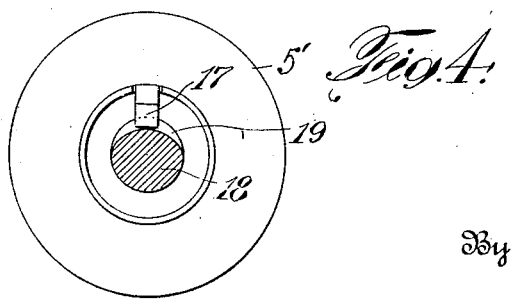
Fig. 4 is a view in section taken along line 4—4 of Fig. 3.

Referring to Fig. 3, in which a modification of my device is shown, the barrel 4 is longitudinally slotted at 15, and a spring element 16, integral with the barrel 14 and of a width equal to the slot 15, is normally bent downwardly into the interior of the barrel. The spring element 16 is provided at its front end with a forwardly bevelled head 17 which acts as a spring catch. The guide member 9 of Figs. 1 and 2 is supplanted in Fig. 3 with a spring plunger 18 normally spring actuated forwardly by the compression spring 23 anchored in the recess 24 of the plunger 18. The face 20 of the barrel is bevelled at 21 to receive the bevelled surface 22 of the plunger in snug and aligning relation.

It will be appreciated that, by either of the two modifications described, there is provided a film spool readily adapted by its own construction and simple coacting magazine parts, to have its one end attached and so aligned as to render it easy to also place the other end in its proper suspensory attachment.

I claim:—

1. In a film spool, an elongated barrel, attachment devices at either end of said barrel, one of said devices consisting in a spring catch integrally formed with said barrel and extending into same, said catch having a bevelled head on its forward end, said barrel being slotted in alignment with and in length and width equal to that of said spring.

2. In combination with a camera magazine, a film spool, suspending means therefor at either end of said magazine, one of said suspending means comprising a rotatable shaft carrying a spring plunger, said film spool comprising an elongated barrel, attachment devices at either end of said barrel, one of said devices consisting in a spring catch integrally formed with said barrel and extending into same, said catch having a bevelled head on its forward end, said barrel being slotted in alignment with and in length and width equal to that of said spring, and said plunger being notched and adapted to be engaged by said spring catch in a position within said barrel.

3. In combination with a film spool in the form of a hollow cylindrical barrel of spring metal, a spring plunger for releasably receiving said spool in suspended position to be rotatable with said plunger, said plunger having a rearwardly bevelled recess, an inwardly extending leaf spring formed of a portion of the wall of said spool and provided with a catch bevelled correspondingly to said plunger and adapted to engage the latter in locked engagement against longitudinal movement.

4. In combination with a film spool, a spring plunger for releasably receiving said spool in suspended rotating position, said plunger being provided with a locking notch, and said spool being provided with a spring operated catch adapted to engage said notch to lock said spool against longitudinal movement.

In testimony whereof, I have signed my name to this specification this 15th day of May, 1929.

DAVID T. EIGHMEY.